United States Patent
Ariyoshi et al.

(10) Patent No.: US 11,920,949 B2
(45) Date of Patent: Mar. 5, 2024

(54) MAP GENERATION APPARATUS

(71) Applicant: Honda Motor Co., Ltd., Tokyo (JP)

(72) Inventors: Tokitomo Ariyoshi, Wako (JP); Shuichi Yokemura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 76 days.

(21) Appl. No.: 17/676,190

(22) Filed: Feb. 20, 2022

(65) Prior Publication Data

US 2022/0268597 A1 Aug. 25, 2022

(30) Foreign Application Priority Data

Feb. 25, 2021 (JP) ................................. 2021-028505

(51) Int. Cl.
*G01C 21/00* (2006.01)
*G01C 21/36* (2006.01)

(52) U.S. Cl.
CPC ..... *G01C 21/3815* (2020.08); *G01C 21/3602* (2013.01); *G01C 21/3841* (2020.08); *G01C 21/387* (2020.08)

(58) Field of Classification Search
CPC ............ G01C 21/3815; G01C 21/3602; G01C 21/3841; G01C 21/387; B60W 60/001; B60W 30/095; B60W 30/0956; B60W 40/00; B60W 40/02; B60W 40/06
See application file for complete search history.

(56) References Cited

U.S. PATENT DOCUMENTS

| | | | | |
|---|---|---|---|---|
| 2017/0269602 A1* | 9/2017 | Nakamura | ............ | G05D 1/0214 |
| 2018/0231387 A1* | 8/2018 | Thiel | .................. | G01C 21/3811 |
| 2021/0354699 A1* | 11/2021 | Sugiyama | ........ | B60W 30/18163 |
| 2022/0301427 A1* | 9/2022 | Ueno | ..................... | G06V 20/44 |

FOREIGN PATENT DOCUMENTS

| | | | | |
|---|---|---|---|---|
| CN | 110654372 A | * | 1/2020 | ............ B60W 30/00 |
| JP | 2014104853 A | | 6/2014 | |
| KR | 2146012 B1 | * | 8/2020 | |

OTHER PUBLICATIONS

Machine Translation of CN-110654372-A (Year: 2020).*
Machine Translation of KR-2146012-B1 (Year: 2020).*

* cited by examiner

*Primary Examiner* — Faris S Almatrahi
*Assistant Examiner* — Sahar Motazedi
(74) *Attorney, Agent, or Firm* — Duft & Bornsen, PC

(57) ABSTRACT

A map generation apparatus including a detection device that detects an external situation around a subject vehicle, and an electronic control unit including a microprocessor and a memory. The microprocessor is configured to perform generating a first map for a current lane on which a subject vehicle travels, based on the external situation detected by the detection device, and acquiring a map information on an opposite lane map for an opposite lane generated by another vehicle traveling on the opposite lane opposite to the current lane. The microprocessor is configured to perform the generating further including generating a second map for the current lane corresponding to a point where the map information on the opposite lane map has been acquired, by inverting the opposite lane map.

8 Claims, 4 Drawing Sheets

MAP GENERATION APPARATUS

CROSS-REFERENCE TO RELATED APPLICATION

This application is based upon and claims the benefit of priority from Japanese Patent Application No. 2021-028505 filed on Feb. 25, 2021, the content of which is incorporated herein by reference.

BACKGROUND OF THE INVENTION

Field of the Invention

This invention relates to a map generation apparatus configured to generate a map around a subject vehicle.

Description of the Related Art

Conventionally, there is a known apparatus in which white lines of a lane and a parking lot frame are recognized using an image captured by a camera mounted on a vehicle, and the recognition results of the white lines are used for vehicle driving control and parking support. Such an apparatus is described, for example, in Japanese Unexamined Patent Publication No. 2014-104853 (JP2014-104853A). In the apparatus disclosed in JP2014-104853A, edge points at which a change in luminance in the captured image is equal to or greater than a threshold is extracted, and the white lines are recognized based on the edge points.

However, if only the camera image of the vehicle is used to recognize the white line, as in the apparatus described in JP2014-104853A, it is not possible to efficiently generate a map including the position information of the white line.

SUMMARY OF THE INVENTION

An aspect of the present invention is a map generation apparatus including a detection device that detects an external situation around a subject vehicle, and an electronic control unit including a microprocessor and a memory connected to the microprocessor. The microprocessor is configured to perform generating a first map for a current lane on which a subject vehicle travels, based on the external situation detected by the detection device, and acquiring a map information on an opposite lane map for an opposite lane generated by another vehicle traveling on the opposite lane opposite to the current lane. The microprocessor is configured to perform the generating further including generating a second map for the current lane corresponding to a point where the map information on the opposite lane map has been acquired, by inverting the opposite lane map.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention is explained with reference to FIGS. 1 to 4. A map generation apparatus according to an embodiment of the invention is applied to a vehicle having a self-driving capability, i.e., a self-driving vehicle, for example. The self-driving vehicle having the map generation apparatus may be sometimes called "subject vehicle" to differentiate it from other vehicles. The subject vehicle is an engine vehicle having an internal combustion engine (engine) as a travel drive source, electric vehicle having a travel motor as the travel drive source, or hybrid vehicle having both of the engine and the travel motor as the travel drive source. The subject vehicle can travel not only in a self-drive mode in which a driving operation by a driver is unnecessary, but also in a manual drive mode in which the driving operation by the driver is necessary.

Figure 1:
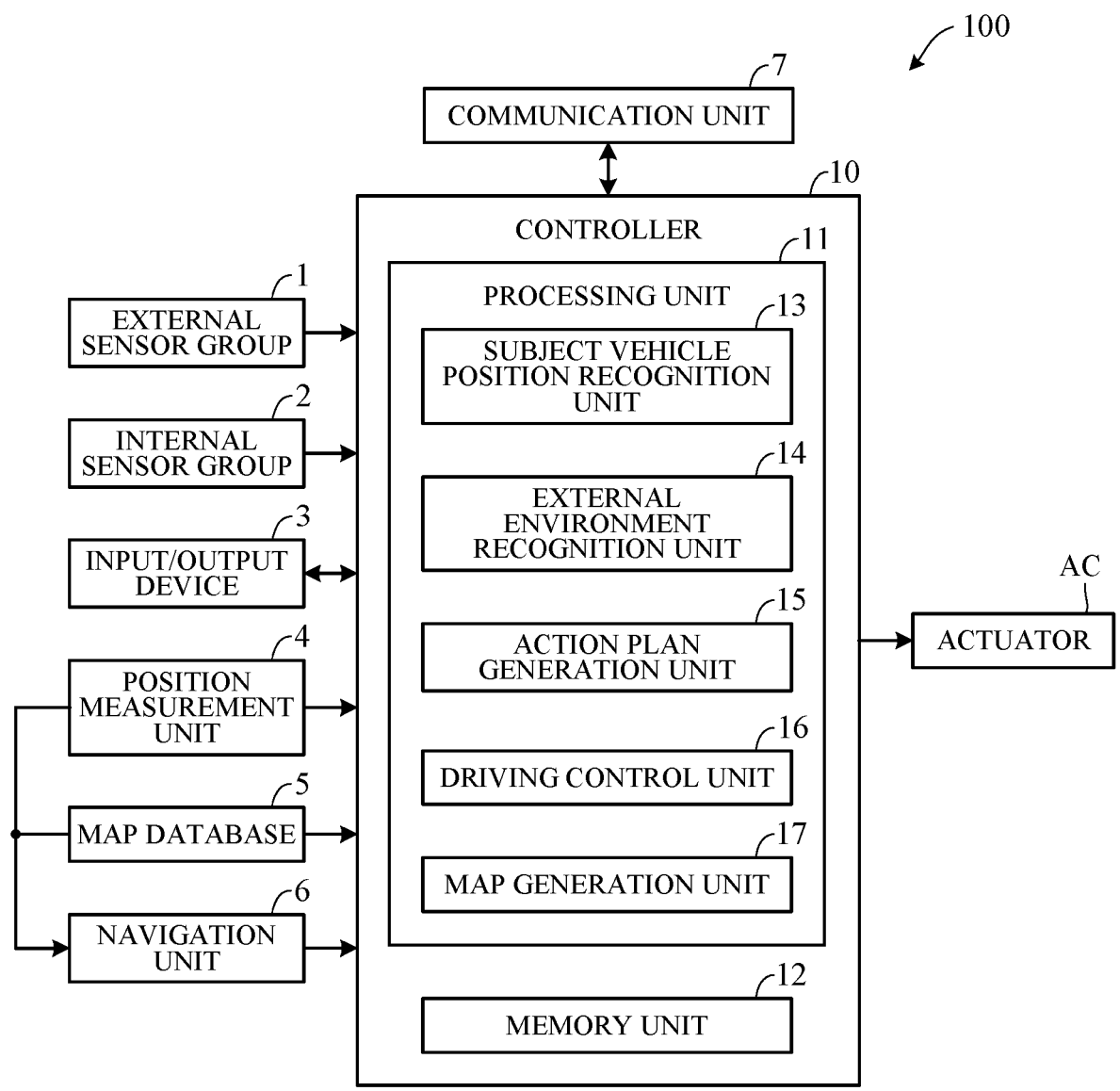
FIG. 1 is a block diagram schematically illustrating an overall configuration of a vehicle control system having a map generation apparatus according to an embodiment of the present invention.

First, the general configuration of the subject vehicle for self-driving will be explained. FIG. 1 is a block diagram schematically illustrating an overall configuration of a vehicle control system 100 of the subject vehicle having the map generation apparatus according to an embodiment of the present invention. As shown in FIG. 1, the vehicle control system 100 mainly includes a controller 10, and an external sensor group 1, an internal sensor group 2, an input/output device 3, a position measurement unit 4, a map database 5, a navigation unit 6, a communication unit 7 and actuators AC which are communicably connected with the controller 10.

The term external sensor group 1 herein is a collective designation encompassing multiple sensors (external sensors) for detecting external circumstances constituting subject vehicle ambience data. For example, the external sensor group 1 includes, inter alia, a LIDAR (Light Detection and Ranging) for measuring distance from the subject vehicle to ambient obstacles by measuring scattered light produced by laser light radiated from the subject vehicle in every direction, a RADAR (Radio Detection and Ranging) for detecting other vehicles and obstacles around the subject vehicle by radiating electromagnetic waves and detecting reflected waves, and a CCD, CMOS or other image sensor-equipped on-board cameras for imaging subject vehicle ambience (forward, reward and sideways).

The term internal sensor group 2 herein is a collective designation encompassing multiple sensors (internal sensors) for detecting driving state of the subject vehicle. For example, the internal sensor group 2 includes, inter alia, a vehicle speed sensor for detecting vehicle speed of the subject vehicle, acceleration sensors for detecting forward-rearward direction acceleration and lateral acceleration of the subject vehicle, respectively, rotational speed sensor for detecting rotational speed of the travel drive source, a yaw rate sensor for detecting rotation angle speed around a vertical axis passing center of gravity of the subject vehicle and the like. The internal sensor group 2 also includes sensors for detecting driver driving operations in manual drive mode, including, for example, accelerator pedal operations, brake pedal operations, steering wheel operations and the like.

The term input/output device 3 is used herein as a collective designation encompassing apparatuses receiving instructions input by the driver and outputting information to the driver. The input/output device 3 includes, inter alia, switches which the driver uses to input various instructions, a microphone which the driver uses to input voice instructions, a display for presenting information to the driver via displayed images, and a speaker for presenting information to the driver by voice.

The position measurement unit (GNSS unit) 4 includes a position measurement sensor for receiving signal from positioning satellites to measure the location of the subject vehicle. The positioning satellites are satellites such as GPS satellites and Quasi-Zenith satellite. The position measurement unit 4 measures absolute position (latitude, longitude and the like) of the subject vehicle based on signal received by the position measurement sensor.

The map database 5 is a unit storing general map data used by the navigation unit 6 and is, for example, implemented using a magnetic disk or semiconductor element. The map data include road position data and road shape (curvature etc.) data, along with intersection and road branch position data. The map data stored in the map database 5 are different from high-accuracy map data stored in a memory unit 12 of the controller 10.

The navigation unit 6 retrieves target road routes to destinations input by the driver and performs guidance along selected target routes. Destination input and target route guidance is performed through the input/output device 3. Target routes are computed based on current position of the subject vehicle measured by the position measurement unit 4 and map data stored in the map database 5. The current position of the subject vehicle can be measured, using the values detected by the external sensor group 1, and on the basis of this current position and high-accuracy map data stored in the memory unit 12, target route may be calculated.

The communication unit 7 communicates through networks including the Internet and other wireless communication networks to access servers (not shown in the drawings) to acquire map data, travel history information, traffic data and the like, periodically or at arbitrary times. In addition to acquiring travel history information, travel history information of the subject vehicle may be transmitted to the server via the communication unit 7. The networks include not only public wireless communications network, but also closed communications networks, such as wireless LAN, Wi-Fi and Bluetooth, which are established for a predetermined administrative area. Acquired map data are output to the map database 5 and/or memory unit 12 via the controller 10 to update their stored map data.

The actuators AC are actuators for traveling of the subject vehicle. If the travel drive source is the engine, the actuators AC include a throttle actuator for adjusting opening angle of the throttle valve of the engine (throttle opening angle). If the travel drive source is the travel motor, the actuators AC include the travel motor. The actuators AC also include a brake actuator for operating a braking device and turning actuator for turning the front wheels FW.

The controller 10 is constituted by an electronic control unit (ECU). More specifically, the controller 10 incorporates a computer including a CPU or other processing unit (a microprocessor) 11 for executing a processing in relation to travel control, the memory unit (a memory) 12 of RAM, ROM and the like, and an input/output interface or other peripheral circuits not shown in the drawings. In FIG. 1, the controller 10 is integrally configured by consolidating multiple function-differentiated ECUs such as an engine control ECU, a transmission control ECU and so on. Optionally, these ECUs can be individually provided.

The memory unit 12 stores high-accuracy detailed road map data (road map information) for self-driving. The road map information includes information on road position, information on road shape (curvature, etc.), information on gradient of the road, information on position of intersections and branches, information on type and position of division line such as white line, information on the number of lanes, information on width of lane and the position of each lane (center position of lane and boundary line of lane), information on position of landmarks (traffic lights, signs, buildings, etc.) as a mark on the map, and information on the road surface profile such as unevennesses of the road surface, etc. The map information stored in the memory unit 12 includes map information (referred to as external map information) acquired from the outside of the subject vehicle through the communication unit 7, and map information (referred to as internal map information) created by the subject vehicle itself using the detection values of the external sensor group 1 or the detection values of the external sensor group 1 and the internal sensor group 2.

The external map information is, for example, information of a map (called a cloud map) acquired through a cloud server, and the internal map information is information of a map (called an environmental map) consisting of point cloud data generated by mapping using a technique such as SLAM (Simultaneous Localization and Mapping). The external map information is shared by the subject vehicle and other vehicles, whereas the internal map information is unique map information of the subject vehicle (e.g., map information that the subject vehicle has alone). In an area in which no external map information exists, such as a newly established road, an environmental map is created by the subject vehicle itself. The internal map information may be provided to the server or another vehicle via the communication unit 7. The memory unit 12 also stores information such as programs for various controls, and thresholds used in the programs.

As functional configurations in relation to mainly self-driving, the processing unit 11 includes a subject vehicle position recognition unit 13, an external environment recognition unit 14, an action plan generation unit 15, a driving control unit 16, and a map generation unit 17.

The subject vehicle position recognition unit 13 recognizes the position of the subject vehicle (subject vehicle position) on the map based on position information of the subject vehicle calculated by the position measurement unit 4 and map information stored in the map database 5. Optionally, the subject vehicle position can be recognized using map information stored in the memory unit 12 and ambience data of the subject vehicle detected by the external sensor group 1, whereby the subject vehicle position can be recognized with high accuracy. The movement information (movement direction, movement distance) of the subject vehicle is calculated based on the detection value of the internal sensor group 2, thereby it is also possible to recognize the position of the subject vehicle. Optionally, when the subject vehicle position can be measured by sensors installed externally on the road or by the roadside, the subject vehicle position can be recognized with high accuracy by communicating with such sensors through the communication unit 7.

The external environment recognition unit 14 recognizes external circumstances around the subject vehicle based on signals from cameras, LIDERs, RADARs and the like of the external sensor group 1. For example, it recognizes position, speed and acceleration of nearby vehicles (forward vehicle or rearward vehicle) driving in the vicinity of the subject vehicle, position of vehicles stopped or parked in the vicinity of the subject vehicle, and position and state of other objects. Other objects include traffic signs, traffic lights, road, buildings, guardrails, power poles, commercial signs, pedestrians, bicycles, and the like. The other objects (road) also include road division lines (white lines, etc.) and stop lines. Recognized states of other objects include, for example, traffic light color (red, green or yellow) and moving speed and direction of pedestrians and bicycles. A part of a stationary object among other objects, constitutes a landmark serving as an index of position on the map, and the external environment recognition unit 14 also recognizes the position and type of the landmark.

The action plan generation unit 15 generates a driving path (target path) of the subject vehicle from present time point to a certain time ahead based on, for example, a target route computed by the navigation unit 6, map information stored in the memory unit 12, subject vehicle position recognized by the subject vehicle position recognition unit 13, and external circumstances recognized by the external environment recognition unit 14. When multiple paths are available on the target route as target path candidates, the action plan generation unit 15 selects from among them the path that optimally satisfies legal compliance, safe efficient driving and other criteria, and defines the selected path as the target path. The action plan generation unit 15 then generates an action plan matched to the generated target path. An action plan is also called "travel plan". The action plan generation unit 15 generates various kinds of action plans corresponding to overtake traveling for overtaking the forward vehicle, lane-change traveling to move from one traffic lane to another, following traveling to follow the preceding vehicle, lane-keep traveling to maintain same lane, deceleration or acceleration traveling. When generating a target path, the action plan generation unit 15 first decides a drive mode and generates the target path in line with the drive mode.

In self-drive mode, the driving control unit 16 controls the actuators AC to drive the subject vehicle along target path generated by the action plan generation unit 15. More specifically, the driving control unit 16 calculates required driving force for achieving the target accelerations of sequential unit times calculated by the action plan generation unit 15, taking running resistance caused by road gradient and the like into account. And the driving control unit 16 feedback-controls the actuators AC to bring actual acceleration detected by the internal sensor group 2, for example, into coincidence with target acceleration. In other words, the driving control unit 16 controls the actuators AC so that the subject vehicle travels at target speed and target acceleration. On the other hand, in manual drive mode, the driving control unit 16 controls the actuators AC in accordance with driving instructions by the driver (steering operation and the like) acquired from the internal sensor group 2.

The map generation unit 17 generates the environment map constituted by three-dimensional point cloud data using detection values detected by the external sensor group 1 during traveling in the manual drive mode. Specifically, an edge indicating an outline of an object is extracted from a camera image acquired by the camera based on luminance and color information for each pixel, and a feature point is extracted using the edge information. The feature point is, for example, an intersection of the edges, and corresponds to a road division line, a corner of a building, a corner of a road sign, or the like. The map generation unit 17 calculates the distance to the extracted feature point and sequentially plots the feature point on the environment map, thereby generating the environment map around the road on which the subject vehicle has traveled. The environment map may be generated by extracting the feature point of an object around the subject vehicle using data acquired by radar or LIDAR instead of the camera.

The subject vehicle position recognition unit 13 performs subject vehicle position estimation processing in parallel with map creation processing by the map generation unit 17. That is, the position of the subject vehicle is estimated based on a change in the position of the feature point over time. The map creation processing and the position estimation processing are simultaneously performed, for example, according to an algorithm of SLAM using signals from the camera or LIDAR. The map generation unit 17 can generate the environment map not only when the vehicle travels in the manual drive mode but also when the vehicle travels in the self-drive mode. If the environment map has already been generated and stored in the memory unit 12, the map generation unit 17 may update the environment map with a newly obtained feature point.

Figure 2:
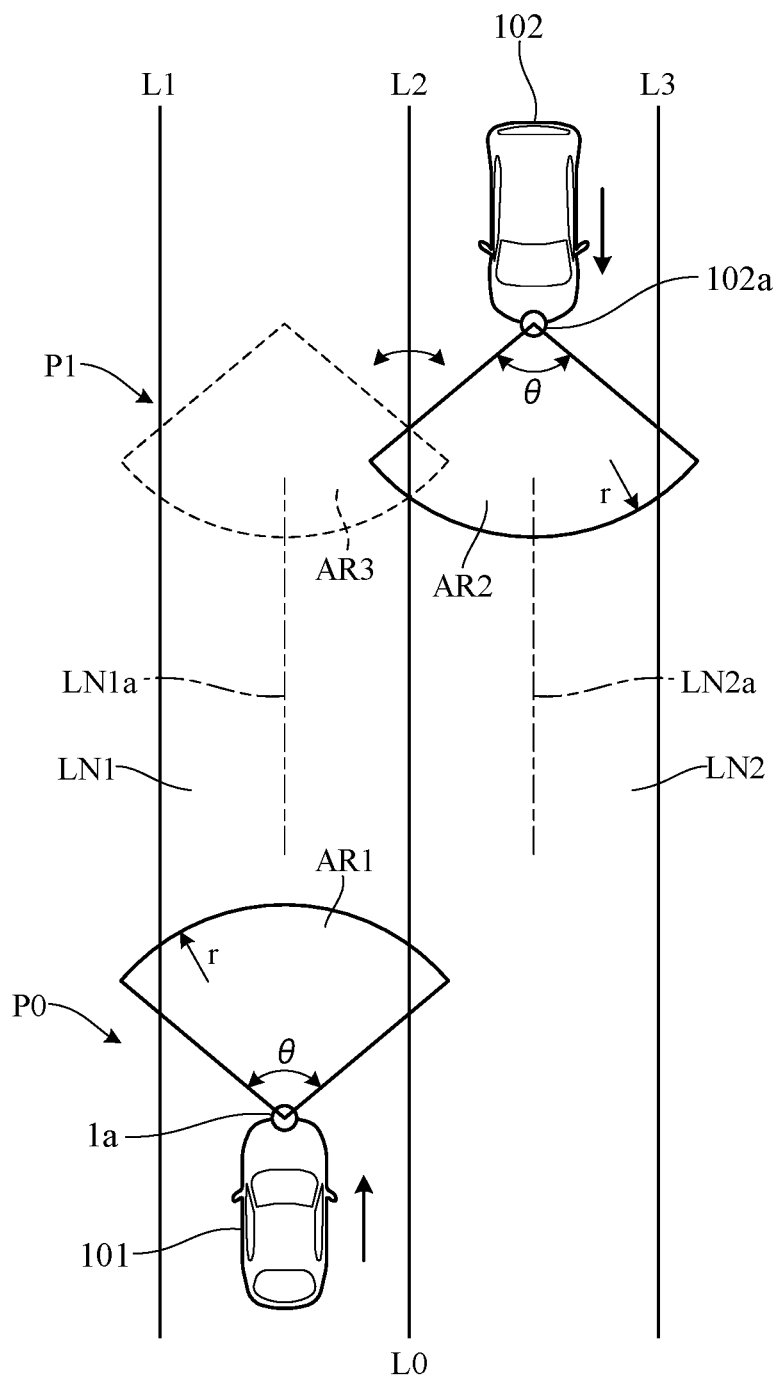
FIG. 2 is a view illustrating an example of a traveling scene to which the map generation apparatus according to the embodiment of the invention is applied.

A configuration of a map generation apparatus according to the present embodiment will be described. FIG. 2 is a diagram illustrating an example of a driving scene to which the map generation apparatus 50 according to the present embodiment is applied, and illustrates a middle of a scene in which a subject vehicle 101 travels while generating an environmental map in a manual drive mode. More specifically, FIG. 2 illustrates the scene in which the subject vehicle travels on the current lane (first lane LN1) defined by left and right division lines L1 and L2. FIG. 2 also illustrates another vehicle 102 traveling on opposite lane extending parallel to the current lane and opposite to the current lane, that is, the opposite lane (second lane LN2) defined by left and right division lines L2 and L3.

As illustrated in FIG. 2, a camera 1a is mounted on a front portion of the subject vehicle 101. The camera 1a has a unique viewing angle θ determined by the performance of the camera and a maximum detection distance r. An inside of a fan-shaped area AR1 having a radius r and a central angle θ centered on the camera 1a is an area of an external space detectable by the camera 1a, that is, a detectable area AR1. The detectable area AR1 includes, for example, a plurality of division lines (for example, white lines) L1 and L2. Note that, in a case where a part of the viewing angle of the camera 1a is blocked by the presence of components disposed around the camera 1a, the detectable area AR1 may be different from the illustrated area.

A camera 102a similar to that of the subject vehicle 101 is also mounted on a front portion of other vehicle 102. A detectable area AR2 by the camera 102a is, for example, the same as the detectable area AR1, and an inside of a fan-shaped range having a radius r and a central angle θ centered on the camera 102a is the detectable range. Note that the detectable areas AR2 is determined by the performance of the camera 102a and the attachment position of the camera 102a, the attachment positions of the cameras 1a and 102a, and the detectable area AR1 and the detectable area AR2 may be different from each other.

In FIG. 2, a boundary line L0 between the first lane LN1 and the second lane LN2 is also illustrated. In FIG. 2, the division line L2 is matched with the boundary line L0. However, in actuality, the division line L2 and boundary line L0 are not necessarily matched with each other. The boundary line L0 is located at the center between a first center line LN1a extending along the first lane LN1 through the center in a vehicle width direction of the first lane LN1 and a second center line LN2a extending along the second lane LN2 through the center in a vehicle width direction of the second lane LN2. Therefore, for example, on a road having a median strip, there is the boundary line L0 between a division line on the inner side in the vehicle width direction (the side of the median strip) of the first lane LN1 and a division line on the inner side in the vehicle width direction (the side of the median strip) of the second lane LN2, and the division line L2 and the boundary line L0 are different.

In such a driving scene, by extracting edge points from a camera image acquired while the subject vehicle 101 travels on the current lane, it is possible to generate a map of the current lane (first lane LN1) included in the detectable area AR1. Further, if a map information at a point where the subject vehicle 101 will travel in the future is acquired in advance, the map generation can be efficiently performed by the subject vehicle 101 using the acquired map information. For example, if the map information at the point P1 ahead of the current point P0 in the traveling direction of the subject vehicle 101 is acquired, it is possible to efficiently generate the map. Considering this point, the present embodiment configures a map generation apparatus as follows.

Figure 3:
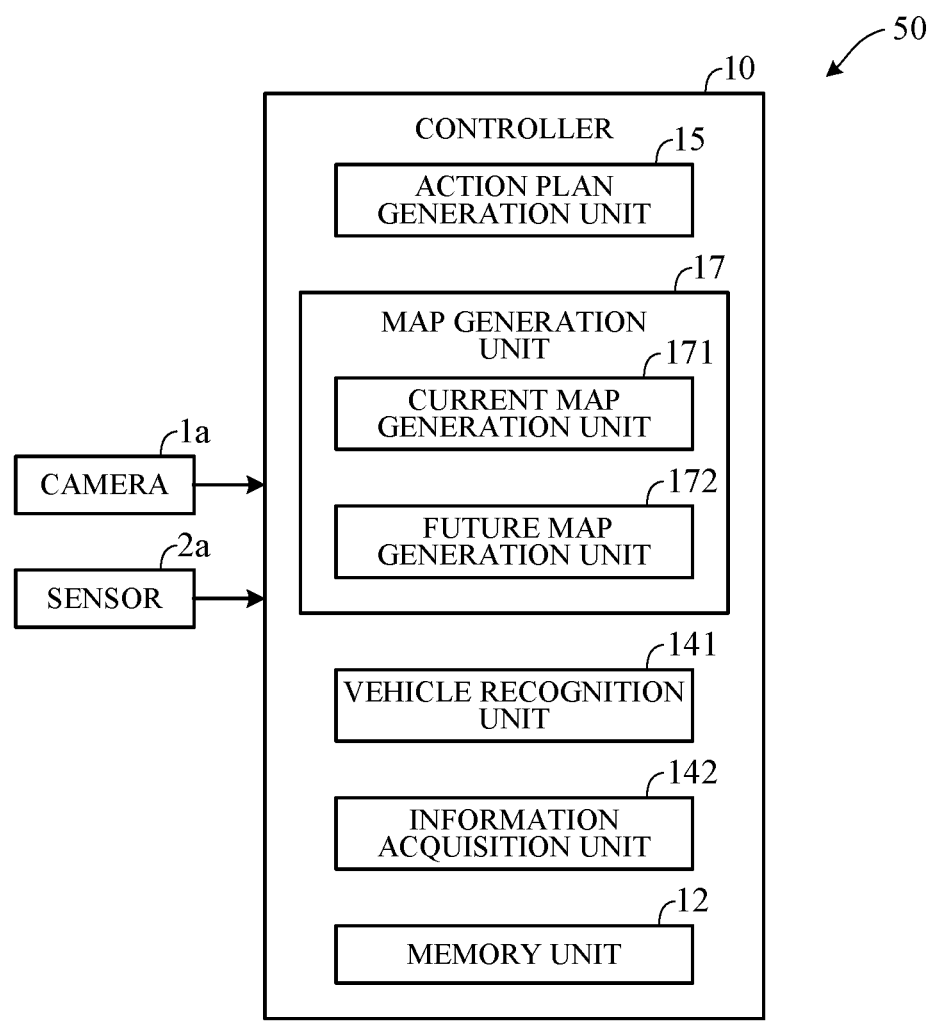
FIG. 3 is a block diagram illustrating a configuration of a substantial part of the map generation apparatus according to the embodiment of the invention.

FIG. 3 is a block diagram illustrating a main configuration of a map generation apparatus 50 according to the present embodiment. The map generation apparatus 50 constitutes a part of a vehicle control system 100 in FIG. 1. As illustrated in FIG. 3, the map generation apparatus 50 has a controller 10, a camera 1a, and a sensor 2a.

The camera 1a is a monocular camera having an imaging element (image sensor) such as a CCD or a CMOS, and constitutes a part of the external sensor group 1 in FIG. 1. The camera 1a may be a stereo camera. The camera 1a is attached to, for example, a predetermined position in the front portion of the subject vehicle 101 (FIG. 2), continuously captures an image of a space in front of the subject vehicle 101, and acquires an image (camera image) of a target object. The target object includes a division line (for example, the division lines L1 and L2 in FIG. 2) on a road. Note that the target object may be detected by a LiDAR or the like instead of the camera 1a or together with the camera 1a.

The sensor 2a is a detection part used to calculate a movement amount and a movement direction of the subject vehicle 101. The sensor 2a is a part of the internal sensor group 2, and includes, for example, a vehicle speed sensor and a yaw rate sensor. That is, the controller 10 (for example, a subject vehicle position recognition unit 13 in FIG. 1) calculates the movement amount of the subject vehicle 101 by integrating a vehicle speed detected by the vehicle speed sensor, calculates a yaw angle by integrating the yaw rate detected by the yaw rate sensor, and estimates a position of the subject vehicle 101 by odometry. For example, when the vehicle travels in the manual drive mode, the position of the subject vehicle is estimated by odometry when the environmental map is created. Note that the configuration of the sensor 2a is not limited thereto, and the position of the subject vehicle may be estimated using information of other sensor.

The controller 10 in FIG. 3 has a vehicle recognition unit 141 and an information acquisition unit 142 in addition to an action plan generation unit 15 and a map generation unit 17, as a functional configuration of a processing unit 11 (FIG. 1). The vehicle recognition unit 141 and the information acquisition unit 142 have a function for recognizing an external environment, and these are included in the external environment recognition unit 14 in FIG. 1. The vehicle recognition unit 141 and the information acquisition unit 142 also have a map generation function. Therefore, these units 141 and 142 can also be included in the map generation unit 17.

The vehicle recognition unit 141 recognizes other vehicle 102 traveling on the opposite lane (second lane LN2) on the basis of the camera image acquired by the camera 1a. In recognizing other vehicle 102, for example, the opposite lane is recognized by recognizing the boundary line between the first lane LN1 and the second lane LN2. Instead of recognizing the boundary line, the opposite lane may be recognized by recognizing a pole or a wall (a median strip or the like) installed at the boundary line between the first lane LN1 and the second lane LN2. Other vehicle 102 traveling on the opposite lane may be recognized by recognizing the direction of other vehicle or by communicating with other vehicle. Further, the vehicle recognition unit 141 recognizes other vehicle 102 traveling on the side of the opposite lane of the point P1 where the subject vehicle 101 is predicted to travel in the future among the recognized other vehicles 102. The vehicle recognition unit 141 may recognize other vehicle 102 by acquiring position information of other vehicle 102 via the communication unit 7. Other vehicle 102 predicted to pass the subject vehicle 101 in the future may be recognized.

Other vehicle 102 recognized by the vehicle recognition unit 141 is other vehicle 102 having a map generation function. That is, as illustrated in FIG. 2, other vehicle 102 is configured to extract feature points of objects (buildings, division lines L2, and L3, or the like) around other vehicle 102 in the detectable area AR2 of the camera 102a, on the basis of the camera image acquired by the camera 102a, thereby generating an environmental map of the second lane LN2 (referred to as an opposite lane map).

The information acquisition unit 142 acquires map information from other vehicle 102 recognized by the vehicle recognition unit 141. That is, communication (inter-vehicle communication) is performed with other vehicle 102 via the communication unit 7, and map information of the opposite lane map generated by other vehicle 102 is acquired. The map information is continuously acquired until the subject vehicle 101 passes other vehicle 102 or until the distance between the subject vehicle 101 and other vehicle 102 becomes a predetermined value (for example, the maximum detection distance r of the camera 1a) or less. The acquired map information is stored in the memory unit 12.

The map generation unit 17 includes a current map generation unit 171 that generates a map (referred to as a current map) of a current point (current place) P0 where the subject vehicle 101 currently travels and a future map generation unit 172 that generates a map (referred to as a future map) of a point (place) P1 where the subject vehicle 101 is scheduled to travel in the future.

When the subject vehicle 101 travels on the first lane LN1 in the manual drive mode, the current map generation unit 171 extracts feature points of objects (buildings, division lines L1 and L2, and the like) around the subject vehicle 101, on the basis of the camera image acquired by the camera 1a, and estimates the subject vehicle position by the sensor 2a, thereby generating an environmental map (current map) around the current position of the subject vehicle 101. The generated environmental map includes position information of the division lines L1 and L2 within the detectable area AR1 of the camera 1a as the internal map information, and map information including the position information is stored in the memory unit 12.

When other vehicle 102 traveling on the second lane LN2 is recognized by the vehicle recognition unit 141, the future map generation unit 172 generates an environmental map (future map) of the first lane LN1 on which the subject vehicle 101 is scheduled to travel in the future, on the basis of the map information of the opposite lane map acquired by the information acquisition unit 142. More specifically, first, the boundary line L0 between the first lane LN1 and the second lane LN2 is set on the basis of the camera image. Next, the opposite lane map is moved symmetrically with the boundary line L0 as a symmetry axis. That is, since the current lane and the opposite lane are expected to have the same configuration, the opposite lane map is inverted bisymmetrically by mirroring.

In other words, the current lane and the opposite lane are estimated to include the same or corresponding map information in a lane width, an intersection position, and the like. Therefore, by symmetrically moving the opposite lane map with respect to the boundary line L0, a good environmental map for the current lane can be obtained. That is, as indicated by a dotted line in FIG. 2, a future map in an area AR3 obtained by symmetrically moving the detectable area AR2 is obtained. The area AR3 includes the division lines L1 and L2 of the first lane LN1. The future map obtained as described above is a simple map obtained by mirroring before the subject vehicle 101 travels at the point P1, and corresponds to a temporary map. Information of the temporary map is stored in the memory unit 12.

After the future map is generated by the future map generation unit 172, when the vehicle travels at the point P1 of the future map, the current map generation unit 171 updates the map information on the future map on the basis of the camera image acquired by the camera 1a. That is, the area AR3 in which the future map has been generated by the mirroring and the detectable area AR1 of the camera 1a at least partially overlap. Therefore, the current map generation unit 171 combines or matches map data based on the camera image with map data of the temporary map to update the map information. The updated map information is stored in the memory unit 12.

The updated map is a complete environmental map at the point P1 of the current lane (first lane LN1). However, when the subject vehicle 101 travels at the point P1, the temporary map is generated in advance, so that the current map generation unit 171 does not need to generate the environmental map of the point P1 from the beginning. Therefore, the environmental map can be efficiently generated, and the processing load of the controller 10 is reduced. When the subject vehicle 101 travels on the first lane LN1, the subject vehicle can also travel in the self-drive mode using the temporary map obtained in advance by mirroring. In this case, the action plan generation unit 15 may set a target route of the subject vehicle 101 on the basis of the temporary map, and the driving control unit 16 may control the actuator AC so that the subject vehicle 101 automatically travels along the target route.

Figure 4:
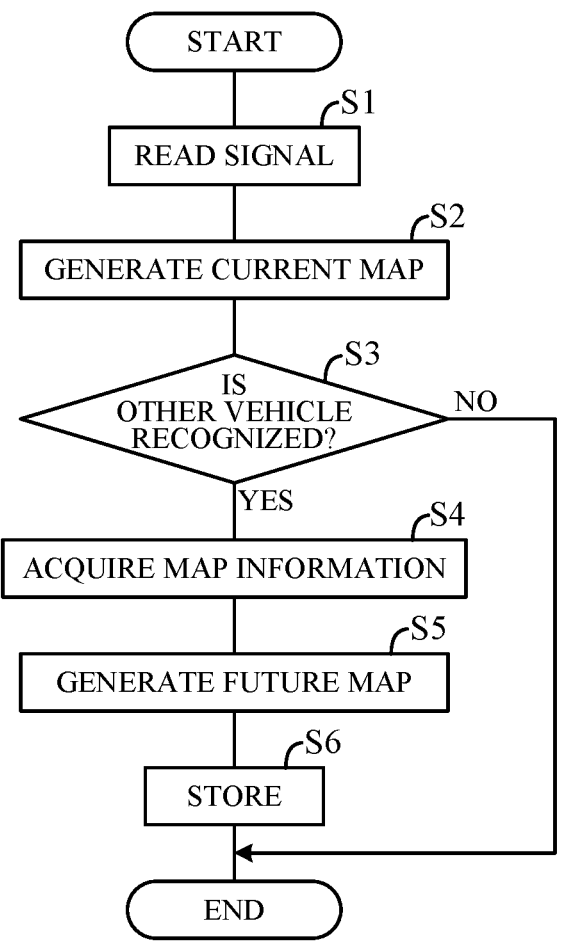
FIG. 4 is a flowchart illustrating an example of processing executed by a controller in FIG. 3.

FIG. 4 is a flowchart illustrating an example of processing executed by the controller 10 of FIG. 3 according to a predetermined program. The processing illustrated in the flowchart is started when the vehicle travels on the first lane LN1 in the manual drive mode, and is repeated at a predetermined cycle.

As illustrated in FIG. 4, first, signals from the camera 1a and the sensor 2a are read in S1 (S: processing step). Next, in S2, an environmental map at the current point P0 of the current lane (first lane LN1), that is, a current map is generated on the basis of the read signals (camera image or the like). Next, in S3, it is determined whether or not other vehicle 102 traveling on the opposite lane (second lane LN2) is recognized on the basis of the camera image read in S1. In a case where the result of determination in S3 is YES, the process proceeds to S4, and in a case where the result of determination in S3 is NO, the processing ends.

In S4, map information on the opposite lane is acquired from other vehicle 102 via the communication unit 7. That is, an environmental map (opposite lane map) generated by other vehicle 102 is acquired. Next, in S5, the acquired opposite lane map is inverted to generate an environmental map (future map) of the point P1 where the subject vehicle 101 travels in the future. Next, in S6, the map information on the current map generated in S2 and the future map generated in S5 is stored in the memory unit 12, and the processing ends.

Note that, although not illustrated in the drawing, when the current map is created in S2, the controller 10 determines whether or not a map of the point is stored in the memory unit 12 in advance. In other words, it is determined whether or not the subject vehicle 101 currently travels at the point P1 where the future map is stored in the past processing of S6. Then, in a case where the subject vehicle travels at the point P1 where the future map is stored, the map information on the future map (temporary map) stored in advance is updated to generate the current map when the current map is created.

When a plurality of other vehicles 102 are recognized in S3, the controller 10 acquires map information on the opposite lane from each other vehicle 102 in S4, and mirrors the opposite lane map in S5. By repeating the above processing, it is possible to generate a plurality of future maps for the same point (for example, the point P1). When the subject vehicle 101 travels at the point P1 where the plurality of future maps are generated, the controller 10 combines the plurality of future maps and updates the map information.

The operation of the map generation apparatus 50 according to the present embodiment is summarized as follows. As illustrated in FIG. 2, when the subject vehicle 101 travels on the current lane (first lane LN1) in the manual drive mode, the environmental map in the detectable area AR1 of the camera 1a including the position information on the division lines L1 and L2 is generated on the basis of the camera image (S2). At this time, when other vehicle 102 traveling on the opposite lane (second lane LN2) on the side of the point P1 is recognized from the camera image of the subject vehicle 101 traveling at the point P0, map information on the opposite lane generated by other vehicle 102 is acquired, and the map information is inverted and converted into map information on the current lane (S4 and S5).

As a result, the environmental map of the point P1 where the subject vehicle 101 travels in the future can be generated in advance. Therefore, the subject vehicle 101 does not need to generate the environmental map at the point P1 from the beginning, and the environmental map at the point P1 can be easily generated using the map information on the opposite lane. In addition, the target path of the subject vehicle 101 can be generated using the environmental map obtained by the mirroring, and the subject vehicle 101 can travel by self-driving.

According to the present embodiment, following functions and effects can be achieved.

(1) The map generation apparatus 50 includes a camera 1a that detects an external situation around the subject vehicle 101; a map generation unit 17 (current map generation unit 171) that generates a current map for the current lane (first lane LN1) on which the subject vehicle 101 travels, on the basis of the external situation detected by the camera 1a; and an information acquisition unit 142 that acquires map information of an opposite lane map for the opposite lane generated by other vehicle 102 traveling on the opposite lane (second lane LN2) opposite to the current lane (FIG. 3). The map generation unit 17 further includes a future map generation unit 172 that generates a future map for the current lane corresponding to the point P1 where the opposite lane map has been acquired by inverting the opposite lane map acquired by the information acquisition unit 142 (FIG. 3). As a result, the map information at the point P1 where the subject vehicle 101 travels can be obtained in advance, and the map can be efficiently generated.

(2) The current map is a map at the current point P0 on the current lane, and the future map is a map at the point P1 where the subject vehicle 101 travels ahead of the current point P0 (FIG. 2). As a result, the map information of the point P1 where the subject vehicle 101 travels in the future can be acquired in advance. Therefore, when the subject vehicle 101 actually passes through the point P1, efficient map generation can be performed using the map information of the future map.

(3) The map generation apparatus 50 further includes a vehicle recognition unit 141 that recognizes other vehicle 102 traveling on the opposite lane (FIG. 3). When other vehicle 102 is recognized by the vehicle recognition unit 141, the information acquisition unit 142 acquires map information of the opposite lane map (FIG. 4). As a result, it is possible to acquire map information necessary for generation of the future map at favorable timing.

(4) After generating the future map by inverting the opposite lane map, the map generation unit 17 updates the future map on the basis of the external situation detected by the camera 1a when the subject vehicle 101 travels on the current lane. As a result, since the future map generated in advance by mirroring is updated using the map information obtained when the vehicle actually travels at the point P1 where the future map is generated, the accuracy of the generation of the environmental map can be improved. In this case, the environmental map is generated using information of the future map generated by the mirroring instead of newly generating the environmental map, so that the processing load of the controller 10 can be reduced.

(5) The map generation apparatus 50 further includes a route setting unit (action plan generation unit 15) that sets a target route when the subject vehicle 101 travels on the opposite lane, on the basis of the future map generated by the map generation unit 17. This enables traveling in the self-drive mode even before traveling in the manual drive mode for generating the environmental map.

The above embodiment may be modified into various forms. Some modifications will be described below. In the above embodiment, the external sensor group 1, which is an in-vehicle detector such as the camera 1a, detects the external situation around the subject vehicle 101. However, the external situation may be detected using an in-vehicle detector such as a LiDAR other than the camera 1a or a detection device other than the in-vehicle detector. In the above embodiment, the environment map as an opposite lane map is generated by the other vehicle 102, similar to the subject vehicle 101. However, the opposite lane map generated by the other vehicle 102 may not be the environment map.

In the above embodiment, the information acquisition unit 142 communicates with other vehicle 102 by inter-vehicle communication via the communication unit 7 and acquires map information on the opposite lane map from the other vehicle 102. However, the map information may be acquired via a server device. In the above embodiment, the map generated by the map generation unit 17 is stored in the memory unit 12. However, the map information may be transmitted to the server device via the communication unit 7 so that other vehicle 102 can use the map information. Alternatively, the map information may be directly transmitted to other vehicle 102 via the inter-vehicle communication. In the above embodiment, the vehicle recognition unit 141 recognizes other vehicle 102 traveling on the opposite lane, on the basis of the camera image. However, other vehicle may be recognized on the basis of information of other detection units such as a LiDAR or via communication (road-to-vehicle communication) between the communication unit installed on the road and the subject vehicle 101 (inter-vehicle communication). Therefore, the configuration of a vehicle recognition unit is not limited to the configuration described above.

In the above embodiment, the map generation unit 17 generates the current map (a first map) at the current point P0 (a first point) on the basis of the camera image acquired by the camera 1a, and generates the future map (a second map) at the point P1 (a second point) where the vehicle travels in the future by inverting the opposite lane map acquired by the information acquisition unit 142. However, the configuration of a map generation unit may be any configuration as long as the first map is generated and the second map for the current lane corresponding to the point where the opposite lane map has been acquired is generated. In the above embodiment, the map generation unit 17 generates the future map at the point P1 where the subject vehicle 101 travels in the future as the second map. However, the map generation unit may acquire the map at the point P0 where the subject vehicle 101 currently travels as the second map, or may acquire the map of the point where the subject vehicle has traveled in the past as the second map. Therefore, a relation between the first point and the second point is not limited to the relation described above.

In the above embodiment, the map generation unit 17 generates the future map by symmetrically moving the opposite lane map with the boundary line L0 as a symmetry axis. However, the inversion mode of the opposite lane map is not limited to line symmetry with the boundary line as the symmetry axis. In the above embodiment, the action plan generation unit 15 as a route setting unit sets the target route for self-driving using the future map (a temporary map) generated by the mirroring. However, the setting of the target route for self-driving may be performed using a complete map (for example, an updated map) instead of using the temporary map.

In the above embodiment, the example in which the map generation apparatus is applied to the self-driving vehicle has been described. That is, the example in which the self-driving vehicle generates the environmental map has been described. However, the present invention can be similarly applied to a case where a manual driving vehicle having or not having a driving support function generates the environmental map.

The present invention can also be used as a map generation method including generating a first map for a current lane LN1 on which a subject vehicle 101 travels, based on an external situation around the subject vehicle 101 detected by a detection device such as the camera 1a, and acquiring a map information on an opposite lane map for an opposite lane LN2 generated by another vehicle 102 traveling on the opposite lane LN2 opposite to the current lane LN1, wherein the generating further includes generating a second map for the current lane LN1 corresponding to a point where the map information on the opposite lane map has been acquired, by inverting the opposite lane map.

The above embodiment can be combined as desired with one or more of the above modifications. The modifications can also be combined with one another.

According to the present invention, a map generation can be efficiently performed.

Above, while the present invention has been described with reference to the preferred embodiments thereof, it will be understood, by those skilled in the art, that various changes and modifications may be made thereto without departing from the scope of the appended claims.

What is claimed is:

1. A map generation apparatus, comprising:
 a detection device that detects an external situation around a subject vehicle, the external situation including a pair of left and right division lines for defining a current lane on which the subject vehicle travels;
 a communication unit; and
 an electronic control unit including a microprocessor and a memory connected to the microprocessor,
 the microprocessor is configured to perform:
 generating including generating a first map for the current lane including position information on the pair of left and right division lines, based on the external situation detected by the detection device;
 acquiring map information on an opposite lane map for an opposite lane generated by another vehicle traveling on the opposite lane opposite to the current lane through the communication unit, the opposite lane map including position information on a pair of left and right division lines for defining the opposite lane; and
 the generating further including setting a symmetry axis at a center between a first center line extending along the current lane through a center in a left-right direction of the current lane and a second center line extending along the opposite lane through a center in the left-right direction of the opposite lane and generating a second map for the current lane corresponding to a point where the map information on the opposite lane map has been acquired, by inverting the opposite lane map acquired through the communication unit symmetrically in the left-right direction with respect to the symmetry axis,
 wherein the subject vehicle autonomously travels on the current lane based on the second map.

2. The map generation apparatus according to claim 1, wherein
 the first map is a map at a first point on the current lane, and the second map is a map at a second point ahead of the first point on the current lane in a traveling direction of the subject vehicle.

3. The map generation apparatus according to claim 2, wherein
 the microprocessor is configured to further perform
 setting a target route when the subject vehicle travels on the current lane, based on the second map generated before the subject vehicle passes the second point.

4. The map generation apparatus according to claim 3, wherein
 the subject vehicle is a self-driving vehicle having a self-driving capability, and
 the microprocessor is configured to perform
 the setting including setting the target route used when the subject vehicle passes the second point on the current lane by self-driving.

5. The map generation apparatus according to claim 2, wherein
 the microprocessor is configured to perform
 the generating further including generating the second map at the second point using position information on the pair of left and right division lines on the current lane at the second point, the position information being obtained by inverting the pair of left and right division lines on the opposite lane at the second point symmetrically in the left-right direction with respect to the symmetry axis.

6. The map generation apparatus according to claim 1, wherein
 the microprocessor is configured to further perform
 recognizing the other vehicle traveling on the opposite lane, and
 the microprocessor is configured to perform
 the acquiring including acquiring the map information on the opposite lane map when the other vehicle is recognized.

7. The map generation apparatus according to claim 1, wherein
 the microprocessor is configured to perform
 the generating further including updating the second map based on the external situation detected by the detection device when the subject vehicle travels on the current lane after generating the second map by inverting the opposite lane map symmetrically in the left-right direction.

8. A map generation method, comprising:
 generating including generating a first map for a current lane on which a subject vehicle travels, based on an external situation around the subject vehicle detected by a detection device, the external situation including a pair of left and right division lines for defining the current lane, the first map including position information on the pair of left and right division lines;
 acquiring map information on an opposite lane map for an opposite lane generated by another vehicle traveling on the opposite lane opposite to the current lane through a communication unit, the opposite lane map including position information on a pair of left and right division lines for defining the opposite lane; and
 the generating further including setting a symmetry axis at a center between a first center line extending along the current lane through a center in a left-right direction of the current lane and a second center line extending along the opposite lane through a center in the left-right direction of the opposite lane and generating a second map for the current lane corresponding to a point where the map information on the opposite lane map has been acquired, by inverting the opposite lane map acquired through the communication unit symmetrically in the left-right direction with respect to the symmetry axis,
 wherein the subject vehicle autonomously travels on the current lane based on the second map.

* * * * *